Jan. 25, 1944. F. W. SLACK 2,340,149
MOTOR VEHICLE
Filed July 14, 1941 4 Sheets-Sheet 2
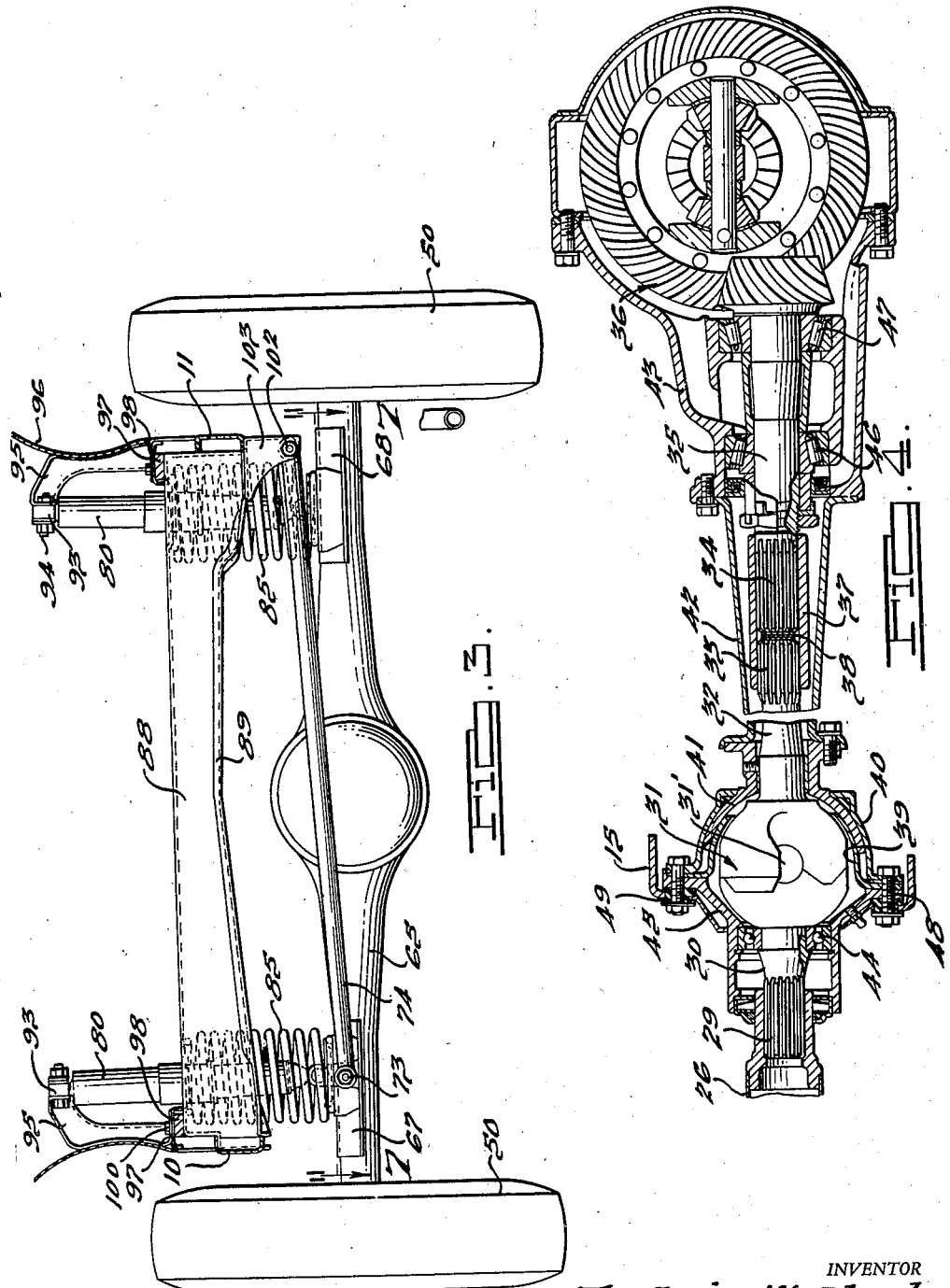
INVENTOR
Frederic W. Slack.
BY
ATTORNEYS.

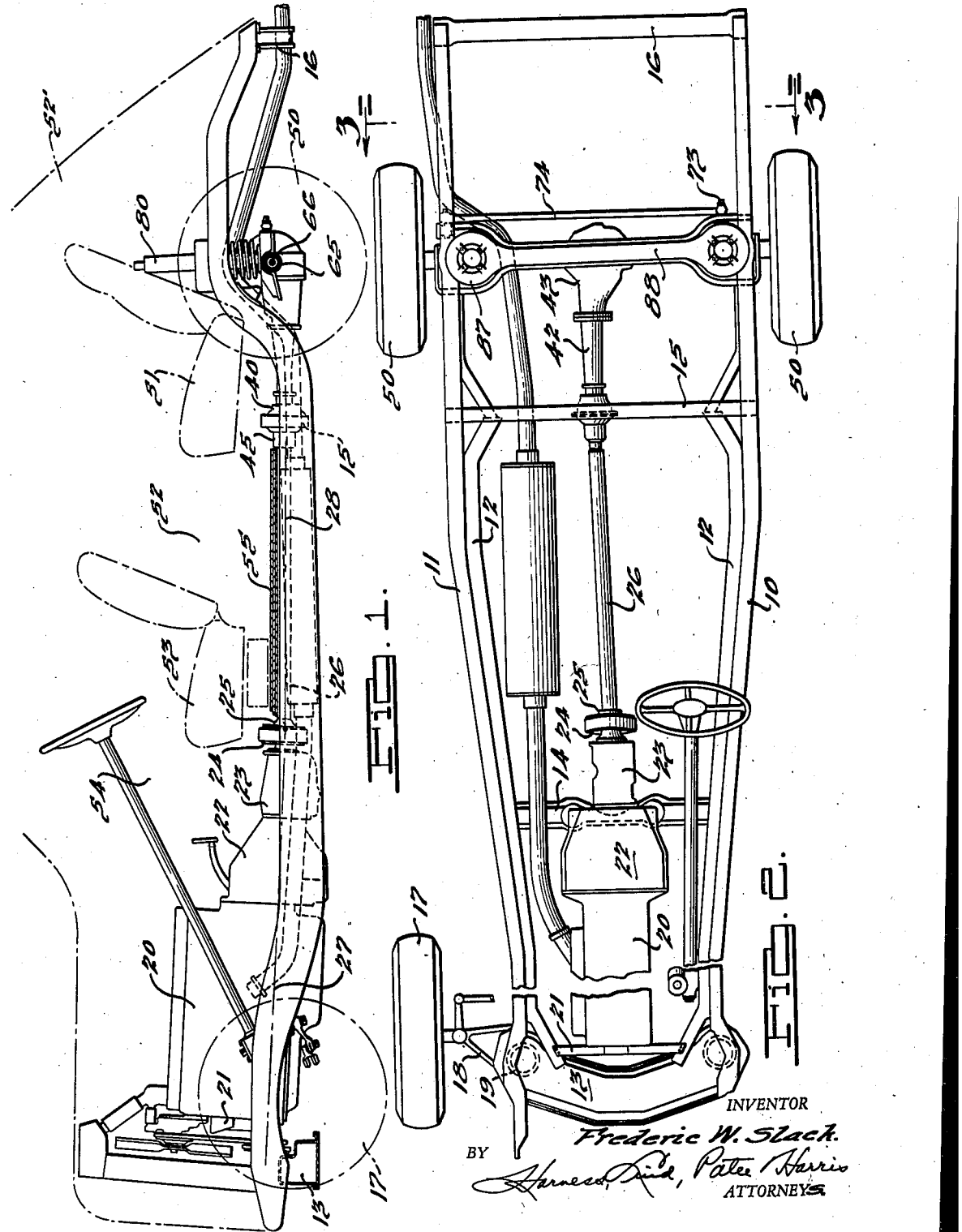

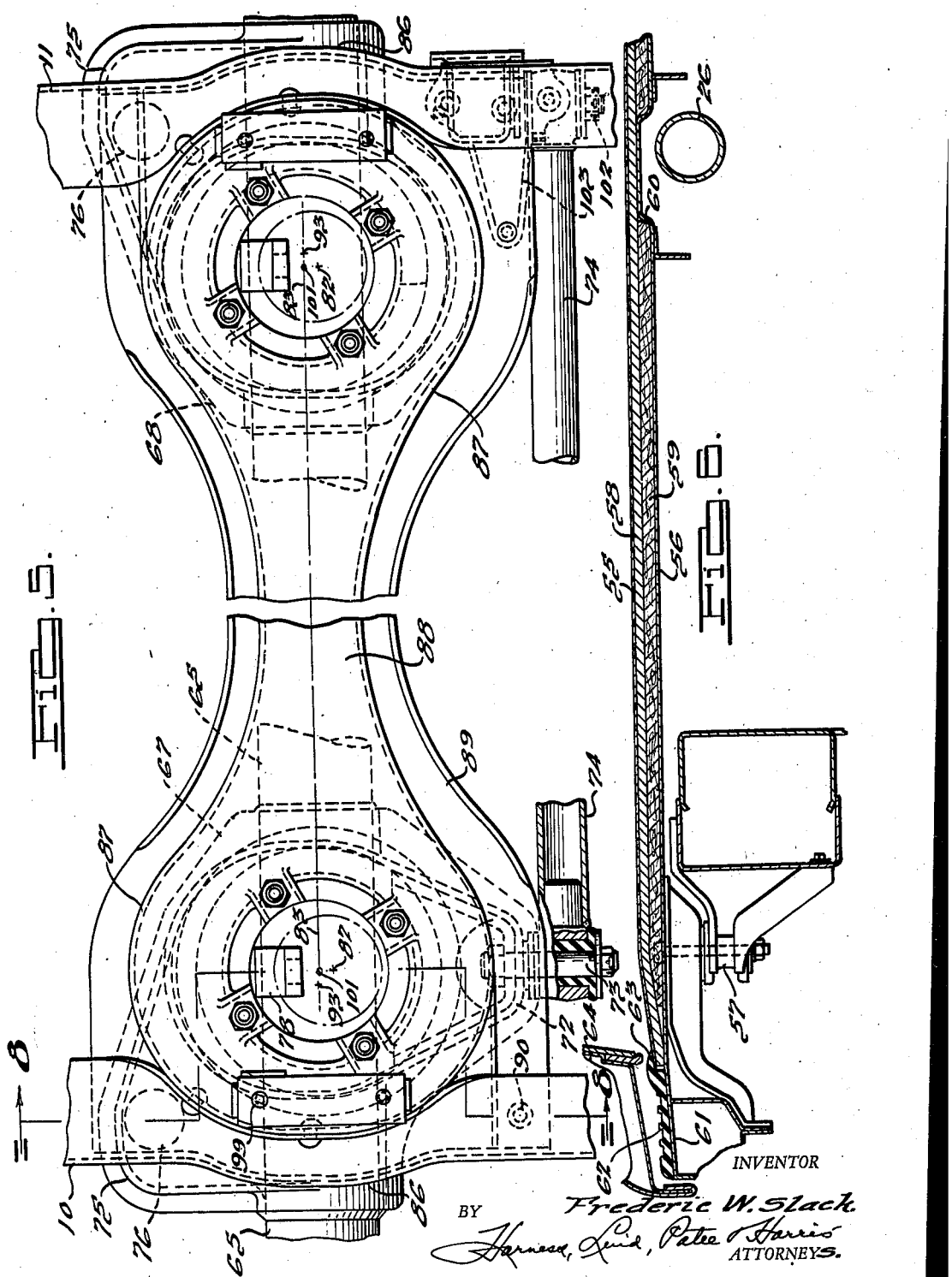

Jan. 25, 1944.                F. W. SLACK                2,340,149
                              MOTOR VEHICLE
                          Filed July 14, 1941         4 Sheets-Sheet 4
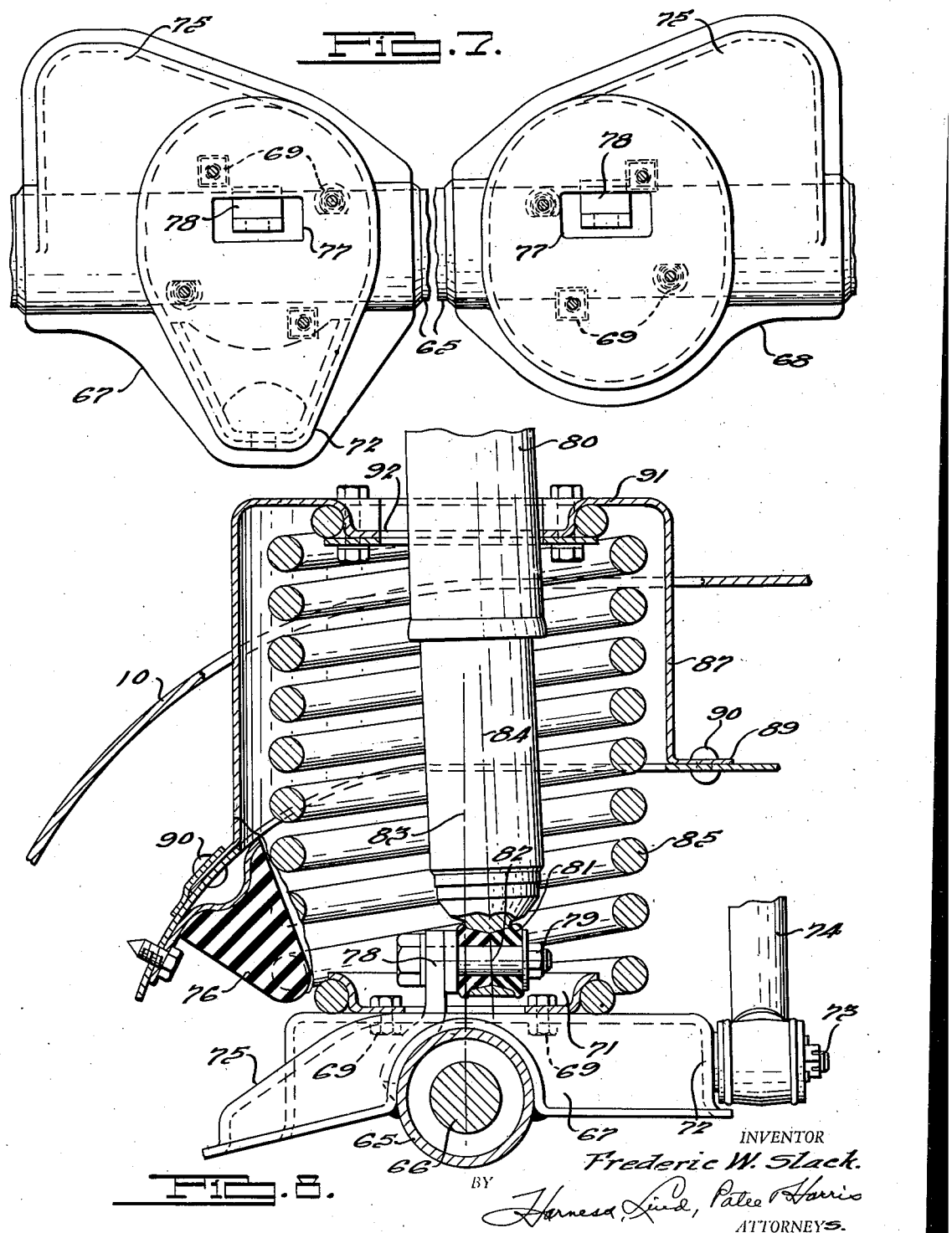
INVENTOR
Frederic W. Slack.
BY
Harness, Dickey, Patee & Harris
ATTORNEYS.

Patented Jan. 25, 1944

2,340,149

UNITED STATES PATENT OFFICE 2,340,149

MOTOR VEHICLE

Frederic W. Slack, Detroit, Mich., assignor to Chrysler Corporation, Highland Park, Mich., a corporation of Delaware Application July 14, 1941, Serial No. 402,297

1 Claim. (Cl. 180—70)

This invention relates to motor vehicles and more particularly to automobiles of the passenger carrying types although not necessarily limited thereto.

In the conventional types of motor vehicles having an engine at the front and a drive passing to the rear ground wheels, it is common practice to provide a tunnel raised from the floor and extending longitudinally of the vehicle in order to accommodate vertical swing of the propeller shaft about its front pivot adjacent the rear of the transmission, such arrangement being deemed necessary in order to position the vehicle body at frame as low as practicable. In certain instances the tunnel at the rear compartment has been made relatively shallow and the floor sloped laterally downwardly in opposite directions presenting, in effect, a wide inverted approximately V-shaped tunnel instead of the aforesaid somewhat more conventional arrangement of a narrow and more localized hump or tunnel. In either instance the resulting effect is generally the same in presenting an unsightly and undesirable floor which is uncomfortable to passengers seated on the rear seat, presents a dangerous condition to passengers in entering and leaving the rear compartment, and prevents desirable use of the rear floor space for carrying travelling bags and providing standing room for children.

It is an object of my invention to overcome the aforesaid objections by providing a motor vehicle of the aforesaid rear wheel drive type wherein the floor of the rear compartment is flat and therefore free from the conventional hump, tunnel, or equivalent inverted wide V-shaped sloping floor—without sacrificing the desirable low positioning of the frame and body. By reason of my invention, the frame and body may even be disposed lower than heretofore possible and still maintain necessary minimum ground clearance.

Another object of my invention is to provide an improved rear wheel drive arrangement for a motor vehicle.

An additional object is to provide an improved wheel suspension affording simplification and improved riding characteristics.

Further objects and advantages of my invention reside in the novel combination and arrangement of parts more particularly hereinafter described in detail in connection with one embodiment which my invention may assume, reference being had to the accompanying drawings in which:

Fig. 1 is a side elevational view illustrating the general arrangement of my motor vehicle chassis.

Fig. 2 is a plan view of the same.

Fig. 3 is a rear sectional elevational view looking forwardly at the rear wheel suspension, the view being taken as indicated by line 3—3 of Fig. 2.

Fig. 4 is an enlarged longitudinal sectional elevational view illustrating the drive from the propeller shaft to the rear axle differential.

Fig. 5 is a top plan view showing the rear wheel suspension, portions at the central region being broken away.

Fig. 6 is a transverse sectional elevational view illustrating the floor at the rear compartment.

Fig. 7 is a plan view illustrating the rear axle housing spring seats, the view being taken as indicated by line 7—7 of Fig. 3.

Fig. 8 is an enlarged transverse sectional elevational view illustrating one of the coil spring and shock absorber mountings, the view being taken approximately as indicated by line 8—8 of Fig. 5 but showing the lower spring seat bracket in elevation.

Referring to the drawings, I have illustrated my motor vehicle as being of the type having a chassis frame A although, if desired, the chassis frame may be incorporated as a unitary part of the body structure A' within keeping of the broader aspects of my invention. In either event it is desirable to provide side frame longitudinals of some form mounted as sprung weight on the wheels. Frame A comprises a pair of main side channel rails 10, 11 being appropriately reinforced by the box-in channel members 12 and having cross brace structures 13, 14, 15 and 16. The front steering ground wheels 17 are by preference independently sprung by customary wishbone linkage 18 and coil springs 19 in part shown in Fig. 2.

The engine 20 is supported on mountings at 21 and at cross brace 14 and is disposed with minimum necessary ground clearance. The engine forms part of the assembly unit comprising housings 22 and 23 respectively for clutch and transmission, the drive passing rearwardly from the transmission through the drum of the parking brake 24 and then through a universal joint 25 of standard construction, thence to the propeller shaft 26.

In the present arrangement I have arranged the axis 27 of the engine crankshaft and drive through the clutch and transmission sloping slightly downwardly and rearwardly at about 4° with the horizontal, the propeller shaft having its axis 28 similarly sloping from the center of joint 25 at approximately 1½° with the horizontal.

At its rear end the propeller shaft 26 is splined at 29 to the drive shaft 30 of a constant velocity type universal joint 31 whose driven shaft 32 terminates in splines 33 adjacent the terminal splines 34 of the drive shaft 35 of the hypoid gearing differential 36. A sleeve 37 drivingly connects the splined portions 33, 34 of shafts 32 and 35, a plurality of shims 38 being disposed between the adjacent ends of these shafts and constituting means for adjusting the center 31' of the joint 31 at the center of the spaced spherical guide segments 39, 40 for the intermediate spherical segment portion 41 carried at the forward end of the differential drive shaft housing assembly 42 which in turn is secured to the differential housing 43.

Shaft 30 is suitably journalled at 44 in the forward universal joint housing 45 while shaft 35 is journalled by thrust bearings 46, 47 in the housing 43. The spherical portions 39, 40 and housing 45 are secured together by fasteners 48 either connected to the cross frame member 15 either directly or, by preference, through noise insulating rubber bushings 49. This arrangement provides a torque tube drive for the vehicle rear ground wheels 50 such that brake and drive reaction is taken through swinging unitary housing parts 43, 42 and 41 thence to the spherical guides 39, 40 and cross member 15. Wheels 50 may rise and fall with the aforesaid swinging unit, being guided for vertical swinging about the center 31' of joint 31 by the spherical guides 39, 40.

The swinging unit 41, 42 and 43 is of relatively short length and the universal joint 31 is located beneath the rear seat 51 of the rear passenger compartment 52 of the vehicle body A', the rear compartment being located as usual in back of the front seat 53 and the front compartment 54. With this location of the universal joint, I avoid the necessity of any tunnel at the floor of the rear compartment 52 because propeller shaft 26 is held at its ends against relative movement with respect to the frame, except as to such minor displacement which may take place occasioned by the whole unit 20, 22, 23 moving slightly on the conventional rubber mountings at supports 14 and 21. The floor housing for the universal joint is now located beneath seat 51 where it is concealed from view and where it cannot interfere with free use of the floor between seats 53 and 51 which is now flat or planar and free from irregularities as will presently be more apparent. At the same time the universal joint housing may project upwardly from the floor level without penalizing the desired low level of the floor or offering an unsightly appearance or obstruction to the passengers.

Referring to Fig. 6 the floor at the rear compartment 52 formed by carpet 55 is now flat or planar between seats 51, 53 and transversely of the vehicle between the side rails 10, 11. If desired the upper plane at carpet 55 may be formed as a metal structural floor part but in practice the metal floor support 56 is disposed below carpet 55 and secured by bolt assemblies 57 to the side rails. Carpet 55 is shown with an underlayer of jute 58 glued thereto and resting on a layer of insulation 59 which is glued to floor support 56. The jute 58 and insulation 59 constitute filler material between floor support 56 and the floor itself formed by carpet 55. Near the longitudinal center of the vehicle, in the interest of maintaining floor 55 as low as possible, the jute and insulation are cut away to accommodate a localized longitudinally extending upward depression at 60 formed in the floor support 56 whereby to accommodate the propeller shaft 26.

At each side of compartment 52 laterally outwardly of side rails 10 and 11 the floor support 56 has an outboard running board portion 61 fitted with a rubber tread 62 which at 63 receives an edge of floor 55, the jute and insulation being cut back somewhat in order to provide a smooth fit for the floor and tread at 63. A door 64 of body A' encloses each running board portion 61 and constitutes a side boundary of body A' at compartment 52.

Securely fixed to the differential housing part 43 is the rear axle housing 65 for mounting wheels 50 and for housing the wheel drive shafts 66 which receive drive from differential 36 in the customary manner. Welded to housing 65 are the spring support brackets 67, 68 (Fig. 7) each being in the form of a downwardly cupped stamping provided with a plurality of threaded openings and aligned nuts 69 welded to the bottom face of each of the brackets for receiving the stud bolts 70 whereby to attach a lower spring clamp 71 to the bracket.

Bracket 67 has a rearward projection 72 carrying a fastener assembly 73 (Figs. 5 and 8) for mounting one end of a transversely extending stabilizer bar 74, the other end of which is connected to the side rail 11. Each of the brackets 67 and 68 has a forward projection 75 adapted to engage a jounce rubber bumper 76 (Figs. 5 and 8) depending from the lower flange of each side rail for limiting movement of the axle housing 65 upwardly toward the side rails. Each of the brackets 67 and 68 also has an opening 77 through which a support 78 extends from welded connection with axle housing 65 upwardly to carry the fastener assembly 79 for mounting the lower end of an upstanding hydraulic shock absorber 80 of the telescoping type. Each shock absorber preferably has a rubber bushing mounting 81 so arranged that the center point of movement of the lower end of the shock absorber on the fastener 79 lies at point 82 which is spaced rearwardly from the transverse vertical plane 83 containing the axis of shafts 66 and housing 65. The axis 84 of the shock absorber inclines upwardly and forwardly toward plane 83.

Each bracket 67, 68 supports the lower end of a coil spring 85 whose vertical axis lies approximately in plane 83 such that the shock absorber pivot 82 is offset longitudinally from the axis of the coil spring which surrounds the lower portion of the shock absorber. At the region of the coil springs, each frame side rail 10, 11 is bowed laterally outwardly at 86 (Fig. 5) for accommodating a coil spring 85 and for riveted connection with the hollow cylindrical end portion 87 of the cross brace 88 having the bottom outwardly directed marginal stiffening flange 89 riveted at its ends to the bottom flange of the side rails as at 90 (Fig. 8). A spring 85 has its upper end extending into a cylindrical portion 87 and seated on the upper wall 91 thereof, this wall having an opening 92 through which a shock absorber 80 extends for connection at point 93 with the fastener 94 carried by a bracket 95 which extends downwardly along the wheel house 96 in welded engagement therewith and then terminates in an inturned flange 97 seated on a steel block 98 (Figs. 3 and 8) welded to the wall 91 adjacent frame portion 86. The block 98 affords a means for bolting the bracket 95 to cross member 88, each block having threaded openings 99 for receiving a fastener 100 passing through flange 97.

Thus the upper supports for the shock absorbers are firmly supported and structurally tied with the wheel houses and cross brace 88 at regions of maximum rigidity adjacent the side rails.

In addition to the lower shock absorber support points 82 being offset longitudinally rearwardly from the transverse plane 83 containing the axes of coil springs 85 and shafts 66, the upper support points 93 of the shock absorbers are also offset laterally outwardly from the coil spring axes 101. This arrangement compensates for the rising and falling of the wheels about the point of swing at 31' and when one wheel rises and falls relative to another without causing any binding of the shock absorbers at openings 92 or without requiring undesirably large diameter coil springs 85 or openings 92.

Referring to the stabilizer bar 74 having one end thereof connected to axle housing 65 at the bracket projection 72, this stabilizer bar has its opposite end connected at fastener 102 (Figs. 3 and 5) mounted on a bracket 103 which is securely attached to the flange 89 of cross member 88 and to the side rail 11 at the juncture of these frame parts and rearwardly adjacent the right coil spring housing 87.

By reason of my invention, I have provided a flat floor 55 for the rear compartment 52 disposed at desirably low level without interference with the propeller shaft 26 extending beneath the floor, thereby lowering the center of gravity, enhancing safety, riding qualities and appearance, as well as adding to the comfort of the passengers. Furthermore my arrangement provides for a forward continuance of the low level planar floor arrangement beneath the major portion of the depth of the front seat 53 for accommodating of one or more car heaters 104 or other accessories not heretofore accommodated largely because of the necessity of a tunnel for the conventional vertically swinging propeller shaft.

The arrangement of my novel rear wheel torque tube type of drive provides for taking drive thrust and brake reaction at the frame cross member 15 thereby leaving the propeller shaft free for driving function.

Practically the entire portion of floor 55 at the rear compartment longitudinally between seats 51, 53 and transversely between the body side boundaries at doors 64 is in a common plane including the floor portion in the region above the propeller 26. The deviation from this plane of the floor portion outwardly of side rails 10, 11 between fasteners 57 and mat portions 63 at running board 61 is very slight and constitutes only a boundary merging of the floor with the running board mat 62.

I claim:

In a motor vehicle having a rigid rear axle housing carrying the rear vehicle wheels for rising and falling movements, a drive housing structure extending forwardly from said axle housing, a frame structure, spherical joint means between said drive housing and frame structures for compelling swing of said axle housing and drive housing structure about the center of said spherical joint means when said rear wheels rise and fall relative to said frame structure, a drive shaft carrying a universal joint drive portion, means journalling said drive shaft on said frame structure, a driven shaft carrying a universal joint driven portion operably connected to said universal joint drive portion such that the universal joint center lies at the center of said spherical joint means, said driven shaft having a splined rear end portion, a second driven shaft having a forward splined end portion, a sleeve engaging the splines of said driven shafts to effect drive connection therebetween while accommodating adjusting axial displacement of said first drive shaft, shim means between said driven shafts for adjustingly displacing said first drive shaft thereby to center said universal joint with said spherical joint means, said driven shafts being disposed in said drive housing structure for transmitting drive from said drive shaft to said rear wheels.

FREDERIC W. SLACK.